United States Patent
Crombez et al.

(10) Patent No.: US 9,789,873 B2
(45) Date of Patent: Oct. 17, 2017

(54) VEHICLE COASTING CONTROL SYSTEM AND METHOD

(71) Applicant: FORD GLOBAL TECHNOLOGIES, LLC, Dearborn, MI (US)

(72) Inventors: Dale Scott Crombez, Livonia, MI (US); Ryan J. Skaff, Farmington Hills, MI (US); Kenneth Frederick, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 267 days.

(21) Appl. No.: 14/181,691

(22) Filed: Feb. 16, 2014

(65) Prior Publication Data
US 2015/0232098 A1    Aug. 20, 2015

(51) Int. Cl.
*F02D 41/14*    (2006.01)
*B60W 30/18*    (2012.01)
(Continued)

(52) U.S. Cl.
CPC ..... *B60W 30/18072* (2013.01); *F02D 11/105* (2013.01); *F02D 41/2422* (2013.01);
(Continued)

(58) Field of Classification Search
CPC ........ F02D 29/02; F02D 31/003; F02D 41/08; F02D 41/16; B60W 10/06; B60W 10/08; B60W 10/11; B60W 30/18; B60W 30/18054; B60W 30/18072; B60W 2710/065; B60W 2710/0644
USPC ......... 701/102, 110, 111; 123/339.1, 339.14, 123/339.19, 339.2, 339.26, 350, 352–355, 123/361
See application file for complete search history.

(56) References Cited

U.S. PATENT DOCUMENTS

| | | | | |
|---|---|---|---|---|
| 4,493,303 A | * | 1/1985 | Thompson | F02D 41/04 123/352 |
| 5,484,351 A | * | 1/1996 | Zhang | B60W 10/06 477/110 |

(Continued)

FOREIGN PATENT DOCUMENTS

| JP | 2008296619 A2 | 12/2008 |
|---|---|---|
| WO | WO 2012029178 A1 | 3/2012 |

OTHER PUBLICATIONS

BMW Activee Details Emerge, More to Come.
Adaptive Anti-Shock Coasting Lock-Up Control of the Torque Converter Clutch.

*Primary Examiner* — John Kwon
*Assistant Examiner* — Johnny H Hoang
(74) *Attorney, Agent, or Firm* — David Kelley, Esq.; Tung & Associates

(57) ABSTRACT

A vehicle coasting control system for a vehicle having a prime mover includes an accelerator pedal positional throughout an accelerator pedal position range; a vehicle controller interfacing with the accelerator pedal, the vehicle controller adapted to control operating speeds of the prime mover of the vehicle corresponding to positions, respectively, of the accelerator pedal within the accelerator pedal position range; and the vehicle controller is adapted to operate the prime mover at idle when the accelerator pedal is positioned at a coast zone within the accelerator pedal position range. A vehicle coasting control method is also disclosed.

25 Claims, 4 Drawing Sheets

(51) Int. Cl.
*F02D 41/24* (2006.01)
*F02D 11/10* (2006.01)
*F02D 29/02* (2006.01)

(52) U.S. Cl.
CPC ............... *B60W 2030/1809* (2013.01); *B60W 2030/18081* (2013.01); *B60W 2520/10* (2013.01); *B60W 2540/10* (2013.01); *B60W 2710/0666* (2013.01); *F02D 29/02* (2013.01); *F02D 2200/501* (2013.01)

(56) References Cited

U.S. PATENT DOCUMENTS

| | | | | |
|---|---|---|---|---|
| 6,068,574 | A * | 5/2000 | Wild | B60W 30/18 477/110 |
| 6,276,333 | B1 * | 8/2001 | Kazama | F02D 11/105 123/399 |
| 6,654,677 | B2 | 11/2003 | Weber et al. | |
| 6,877,480 | B2 | 4/2005 | Persson et al. | |
| 7,353,804 | B2 * | 4/2008 | Bucktron | F02D 41/0027 123/352 |
| 7,962,257 | B2 | 6/2011 | Kaya et al. | |
| 8,112,218 | B2 * | 2/2012 | Russ | F02D 41/0007 123/406.45 |
| 2006/0000659 | A1 * | 1/2006 | Teslak | B60K 6/12 180/307 |
| 2011/0139117 | A1 * | 6/2011 | Kar | F02D 11/105 123/395 |
| 2012/0053796 | A1 | 3/2012 | Fleming et al. | |

* cited by examiner

| Accelerator Pedal Percent | 0 MPH | 5 MPH | 10 MPH | 15 MPH | 20 MPH | 25 MPH | 30 MPH | 35 MPH |
|---|---|---|---|---|---|---|---|---|
| 0 | 500 | 0 | -23 | -60 | -90 | -120 | -150 | -180 |
| 5 | 620 | 0 | -10 | -32 | -48 | -64 | -80 | -96 |
| 10 | 740 | 29 | 5 | -16 | -24 | -32 | -40 | -48 |
| 15 | 860 | 65 | 22 | -8 | -12 | -16 | -20 | -24 |
| 20 | 980 | 116 | 45 | -4 | -6 | -8 | -10 | -12 |
| 25 | 1100 | 181 | 74 | 0 | 0 | 0 | 0 | 0 |
| 30 | 1220 | 261 | 108 | 0 | 0 | 0 | 0 | 0 |
| 35 | 1340 | 355 | 149 | 0 | 0 | 0 | 0 | 0 |
| 40 | 1460 | 464 | 197 | 0 | 0 | 0 | 0 | 0 |
| 45 | 1580 | 587 | 253 | 0 | 0 | 0 | 0 | 0 |
| 50 | 1700 | 725 | 317 | 2 | 0 | 0 | 0 | 0 |
| 55 | 1820 | 877 | 402 | 130 | 80 | 29 | 19 | 17 |
| 60 | 1940 | 1044 | 522 | 300 | 197.2 | 116 | 77 | 66 |
| 65 | 2060 | 1224 | 678 | 467 | 344.4 | 261 | 174 | 149 |
| 70 | 2180 | 1421 | 872 | 708.0 | 545.6 | 464 | 309 | 265 |
| 75 | 2300 | 1631 | 1104 | 952.4 | 800.8 | 725 | 483 | 414 |
| 80 | 2420 | 1856 | 1348 | 1244.4 | 1110.8 | 1044 | 696 | 597 |
| 85 | 2540 | 2095 | 1692 | 1583.6 | 1475.2 | 1421 | 947 | 812 |
| 90 | 2660 | 2349 | 2050 | 1972.4 | 1894.8 | 1856 | 1237 | 1061 |
| 95 | 2780 | 2617 | 2452 | 2410.8 | 2369.6 | 2349 | 1566 | 1342 |
| 100 | 2900 | 2900 | 2900 | 2900 | 2900 | 2900 | 1933 | 1657 |

| SPEED (MPH) | 40 MPH | 45 MPH | 50 MPH | 55 MPH | 60 MPH | 65 MPH | 70 MPH | 75 MPH | 80 MPH |
|---|---|---|---|---|---|---|---|---|---|
| | -210 | -240 | -270 | -300 | -330 | -360 | -390 | -420 | -450 |
| | -112 | -128 | -144 | -160 | -176 | -192 | -208 | -224 | -240 |
| | -56 | -64 | -72 | -80 | -88 | -96 | -104 | -112 | -120 |
| | -28 | -32 | -36 | -40 | -44 | -48 | -52 | -56 | -60 |
| | -14 | -16 | -18 | -20 | -22 | -24 | -26 | -28 | -30 |
| | 0 | 0 | 0 | 0 | 0 | 0 | 0 | 0 | 0 |
| | 0 | 0 | 0 | 0 | 0 | 0 | 0 | 0 | 0 |
| | 0 | 0 | 0 | 0 | 0 | 0 | 0 | 0 | 0 |
| | 0 | 0 | 0 | 0 | 0 | 0 | 0 | 0 | 0 |
| | 0 | 0 | 0 | 0 | 0 | 0 | 0 | 0 | 0 |
| | 0 | 0 | 0 | 0 | 0 | 0 | 0 | 0 | 0 |
| | 15 | 13 | 12 | 11 | 10 | 9 | 8 | 8 | 7 |
| | 58 | 52 | 46 | 42 | 39 | 36 | 33 | 31 | 29 |
| | 131 | 116 | 104 | 95 | 87 | 80 | 75 | 70 | 65 |
| | 232 | 206 | 186 | 169 | 155 | 143 | 133 | 124 | 116 |
| | 363 | 322 | 290 | 264 | 242 | 223 | 207 | 193 | 181 |
| | 522 | 464 | 418 | 380 | 348 | 321 | 298 | 278 | 261 |
| | 711 | 632 | 568 | 517 | 474 | 437 | 406 | 379 | 355 |
| | 928 | 825 | 742 | 675 | 619 | 571 | 530 | 495 | 464 |
| | 1175 | 1044 | 940 | 854 | 783 | 723 | 671 | 626 | 587 |
| | 1450 | 1289 | 1160 | 1055 | 967 | 892 | 829 | 773 | 725 |

VEHICLE COASTING CONTROL SYSTEM AND METHOD

FIELD

Illustrative embodiments of the disclosure generally relate to systems and methods which control vehicle speed and acceleration. More particularly, illustrative embodiments of the disclosure relate to a vehicle coasting control system and method which enables a vehicle operator to achieve enhanced fuel economy by coasting when not accelerating or maintaining speed of a vehicle.

BACKGROUND

One of the methods which may be used by a vehicle operator to achieve enhanced fuel economy includes coasting when not accelerating or maintaining vehicle speed. Coasting, or applying no powertrain torque to the vehicle wheels, maintains the most kinetic energy while avoiding overbraking and subsequent accelerations. However, conventional accelerator pedal response characteristics may render it difficult for an operator to operate a vehicle using this technique.

Accordingly, a vehicle coasting control system and method which enables a vehicle operator to achieve enhanced fuel economy by coasting when not accelerating or maintaining speed of a vehicle may be desirable.

SUMMARY

Illustrative embodiments of the disclosure are generally directed to a vehicle coasting control system for a vehicle having a prime mover. An illustrative embodiment of the system includes an accelerator pedal positional throughout an accelerator pedal position range; a vehicle controller interfacing with the accelerator pedal, the vehicle controller adapted to control operating speeds of the prime mover of the vehicle corresponding to positions, respectively, of the accelerator pedal within the accelerator pedal position range; and the vehicle controller is adapted to operate the prime mover at idle when the accelerator pedal is positioned at a coast zone within the accelerator pedal position range.

Illustrative embodiments of the disclosure are further generally directed to a vehicle coasting control method. An illustrative embodiment of the method includes determining whether an accelerator pedal of a vehicle is at a coast zone within an accelerator pedal position range of the accelerator pedal and operating a prime mover of the vehicle at idle if the accelerator pedal is at the coast zone.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figure 1:
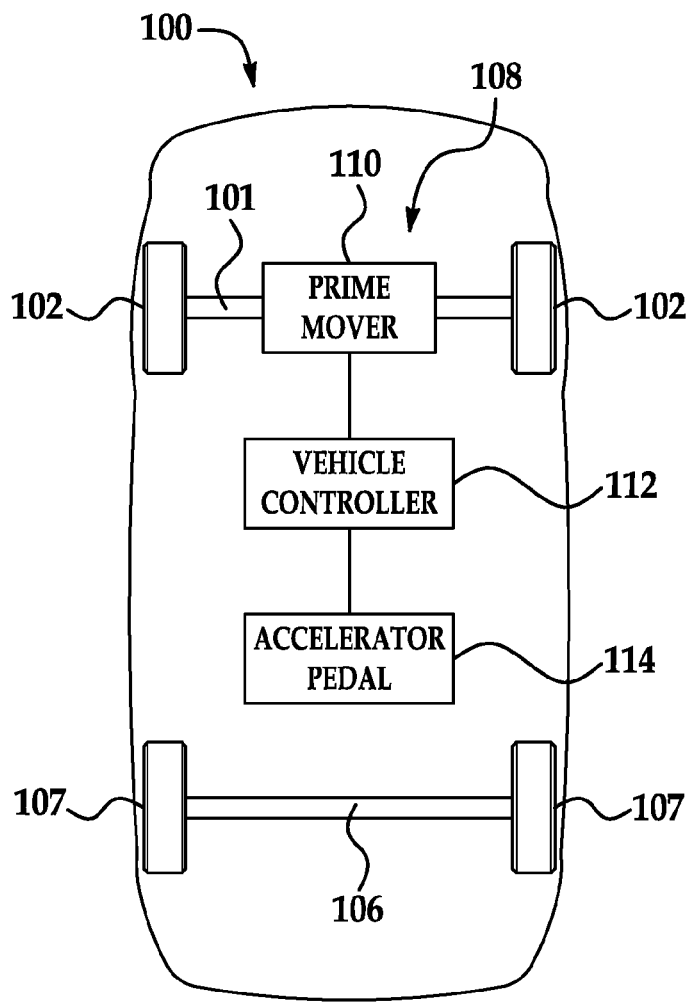
FIG. 1 is a block diagram of a vehicle in implementation of an illustrative embodiment of the vehicle coasting control system.
Figure 1A:
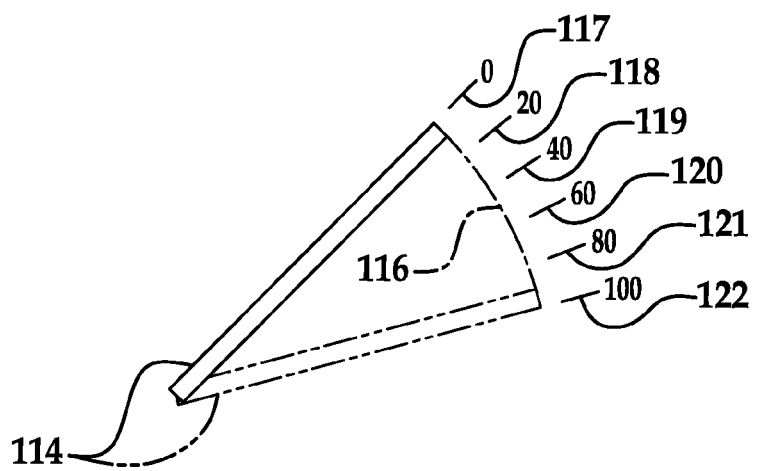
FIG. 1A is a side view of an accelerator pedal and an exemplary accelerator pedal position range for the accelerator pedal.

Referring initially to FIGS. 1 and 1A, a vehicle 100 in implementation of an illustrative embodiment of the vehicle coasting control system is shown. The vehicle 100 may include a front axle 101 on which is mounted a pair of front wheels 102 and a rear axle 106 on which is mounted a pair of rear wheels 107. A prime mover 110 drivingly engages at least one of the front wheels 102 and the rear wheels 107 to convey the vehicle 100 at speeds within a speed range of the vehicle 100. In some embodiments, the prime mover 110 may include an internal combustion (IC) engine. In some embodiments, the prime mover 110 may include an electric motor. In some embodiments, the vehicle 100 may be a hybrid electric vehicle (HEV) in which the prime mover 110 is an IC engine and an electric motor.

A vehicle coasting control system 108 includes a vehicle controller 112 which mechanically and/or electrically interfaces with the prime mover 110. An accelerator pedal 114 mechanically and/or electrically interfaces with the vehicle controller 112. As shown in FIG. 1A, the accelerator pedal 114 may be selectively positional throughout an accelerator pedal position range 116. The accelerator pedal position range 116 may include a minimum (0%) pedal position 117 which corresponds to minimum (zero) depression of the accelerator pedal 114 and a maximum (100%) pedal position 122 which corresponds to maximum depression of the accelerator pedal 114. For purposes of description herein, the accelerator pedal position range 116 may include a 20% pedal position 118, a 40% pedal position 119, a 60% pedal position 120 and an 80% pedal position 121 which correspond to 20%, 40%, 60% and 80% depression of the accelerator pedal 114, respectively.

In operation of the vehicle 100, the vehicle controller 112 may operate the prime mover 110 at idle (minimum operating capacity) when the accelerator pedal 114 is at the 0% pedal position 117. The vehicle controller 112 may operate the prime mover 110 at maximum operating capacity when the accelerator pedal 114 is at the 100% pedal position 122. The vehicle controller 112 may operate the prime mover 110 between the minimum operating capacity and the maximum operating capacity when the accelerator pedal 114 is between the minimum pedal position 117 and the maximum pedal position 122. The vehicle controller 112 may operate the prime mover 110 at operating capacities which are generally proportional in magnitude to the extent to which the accelerator pedal 114 is depressed throughout the accelerator pedal position range 116 to convey the vehicle 100 at the respective speeds within the speed range of the vehicle. Thus, for example and without limitation, the vehicle controller 112 may operate the prime mover 110 at approximately 20% of the maximum operating capacity when the accelerator pedal 114 is at the 20% pedal position 118 of the accelerator pedal position range 116. Likewise, the vehicle controller 112 may operate the prime mover 110 at approximately 80% of the maximum operating capacity when the accelerator pedal 114 is at the 80% pedal position 121 of the accelerator pedal position range 116.

The vehicle controller 112 is programmed to operate the prime mover 110 at idle when the accelerator pedal 114 is in at least one selected pedal position or range of pedal positions between the minimum pedal position 117 and the maximum pedal position 122 at at least one of the speeds of the vehicle 100 within the speed range of the vehicle. In some embodiments, the vehicle controller 112 may be programmed to operate the prime mover 110 at idle when the accelerator pedal 114 is within a coast zone which may be at any point or range between the 0% pedal position 117 and the 100% pedal position 122 at at least one of the speeds of the vehicle 100 within the speed range of the vehicle. For example and without limitation, in some embodiments, the coast zone may begin at the 20% pedal position 118 and end at the 60% pedal position 120. Accordingly, the vehicle controller 112 accelerates the operating speed of the prime mover 110 from idle to 20% of maximum operating capacity as the accelerator pedal 114 is depressed from the minimum pedal position 117 to the 20% pedal position 118. The vehicle controller 112 operates the prime mover 110 at idle when the accelerator pedal 114 is depressed from the 20% pedal position 118 to the 60% pedal position 120. The vehicle controller 112 again accelerates the operating speed of the prime mover 110 from 60% operating capacity to 100% operating capacity as the accelerator pedal 114 is depressed from the 60% pedal position 120 to the maximum pedal position 122. In other embodiments, the coast zone may extend from the 40% pedal position 119 to the 80% pedal position 121 or between any other pair of pedal positions between the minimum pedal position 117 and the maximum pedal position 122. In some embodiments, the vehicle controller 112 may be programmed to operate the prime mover 110 at idle in the coast zone only at higher speeds of the vehicle 100 within the speed range of the vehicle.

In exemplary operation of the vehicle coasting control system 108, during operation of the vehicle 100, an operator (not shown) depresses the accelerator pedal 114 to accelerate the operating speed of the prime mover 110 and the speed of the vehicle 100. When the accelerator pedal 114 reaches the coast zone within the accelerator pedal position range 116, the vehicle controller 112 operates the prime mover 110 at idle. In the event that the operator of the vehicle 100 depresses the accelerator pedal 114 beyond the coast zone, the vehicle controller 112 resumes acceleration of the operating speed of the prime mover 110 to correspondingly increase the speed of the vehicle 100 in proportion to the position of the accelerator pedal 114 within the accelerator pedal position range 116.

As long as the accelerator pedal 114 is within the coast zone of the accelerator pedal position range 116, the vehicle controller 112 operates the prime mover 110 at idle, as was noted above. Therefore, the operator of the vehicle 100 is able to control coasting of the vehicle 100 for longer periods than would otherwise be possible since the vehicle operator need not repeatedly accelerate and apply vehicle brakes to maintain the desired speed. This expedient facilitates more fuel-efficient operation of the vehicle 100 particularly during highway operation when coasting may be desired over long stretches of travel.

Figure 2:
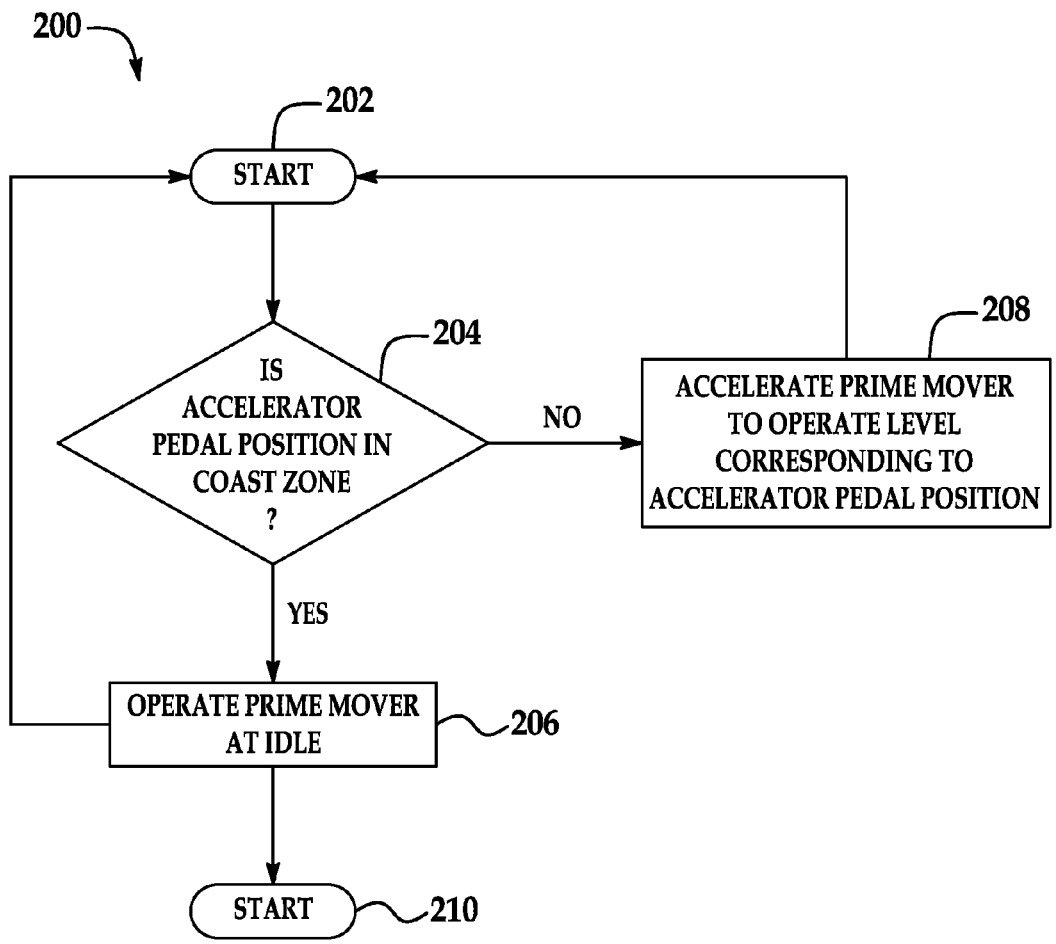
FIG. 2 is a flow diagram of an illustrative embodiment of the vehicle coasting control method.

Referring next to FIG. 2, a flow diagram 200 of an illustrative embodiment of the vehicle coasting control method is shown. The method may begin upon starting of the vehicle at block 202. At block 204, a determination may be made as to whether an accelerator pedal of the vehicle is positioned in a coast zone within an accelerator pedal position range. If the accelerator pedal is positioned within the coast zone, the prime mover of the vehicle may be operated at idle at block 206. The method may return to block 202 and again proceed to determination of the pedal position at block 204.

If the accelerator pedal is not positioned within the coast zone at block 204, the prime mover may be accelerated to an operating level which corresponds to the position of the accelerator pedal within the accelerator pedal position range at block 208. The method may return to block 202 and again proceed to determination of the pedal position at block 204. The method may end at block 210 upon termination of operation of the vehicle.

In some embodiments of the method 200, an additional query may be made after block 204 in which the speed of the vehicle is determined. If the accelerator pedal position is within the coast zone at block 204 and the speed of the vehicle is lower than a predetermined speed value or range of speed values for the vehicle, the prime mover may be accelerated to an operating level which corresponds to the accelerator pedal position (block 208). If the accelerator pedal position is within the coast zone at block 204 and the speed of the vehicle exceeds the predetermined speed value or range of speed values for the vehicle, the prime mover may be operated at idle at block 206.

Figures 3, 3A:
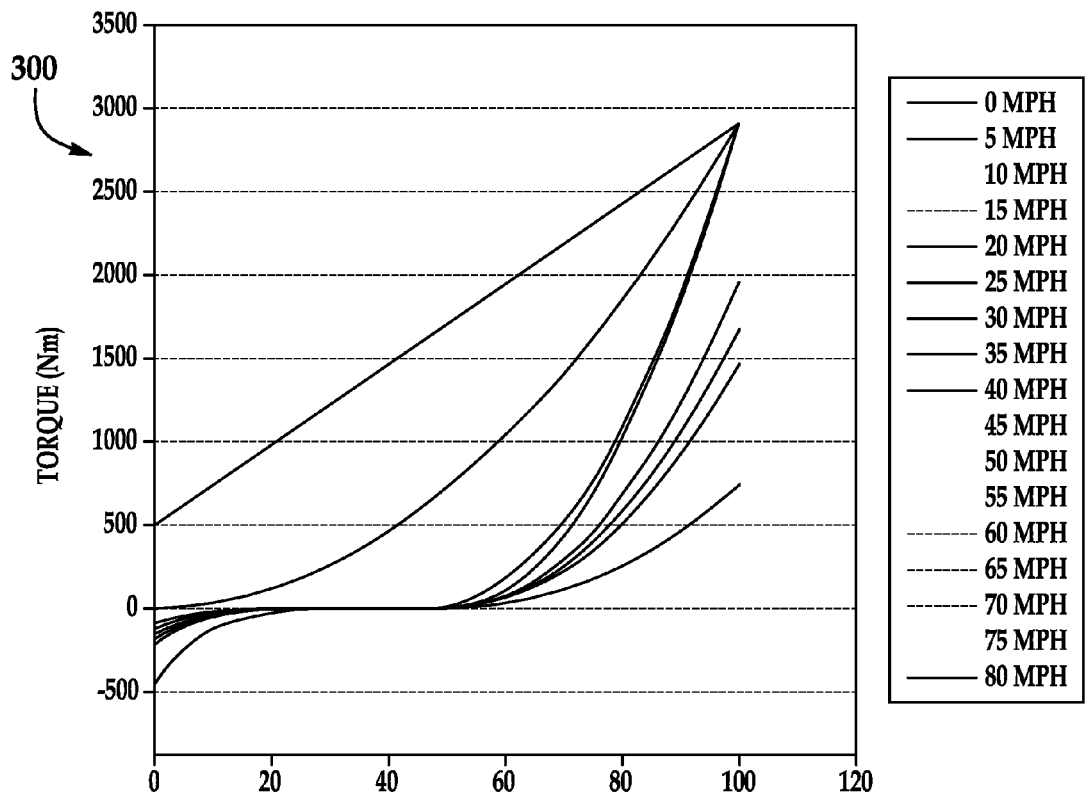
FIG. 3 is a table which illustrates torque (Nm) of a prime mover in a vehicle as a function of vehicle accelerator pedal position (%) at various speeds (mph) of the vehicle according to an illustrative embodiment of the vehicle coasting control method.
FIG. 3A is an exemplary accelerator pedal map which incorporates the data of FIG. 3 in implementation of an illustrative embodiment of the vehicle coasting control method.

Referring next to FIGS. 3 and 3A, a table which illustrates torque (Nm) of a prime mover in a vehicle as a function of vehicle accelerator pedal position (%) at various speeds (mph) of the vehicle according to an illustrative embodiment of the vehicle coasting control method is shown in FIG. 3. An exemplary accelerator pedal map 300 which incorporates the data of FIG. 3 in implementation of an illustrative embodiment of the vehicle coasting control method is shown in FIG. 3A. In the graph 300, torque (Nm) which is applied by the prime mover of the vehicle is plotted as a function of the accelerator pedal position as percentage of the accelerator pedal position range. At lower vehicle speeds, the coast zone, or portion of the accelerator pedal position range in which the prime mover of the vehicle is at idle, is from about the 25% pedal position to about the 50% pedal position.

Figures 4, 4A:
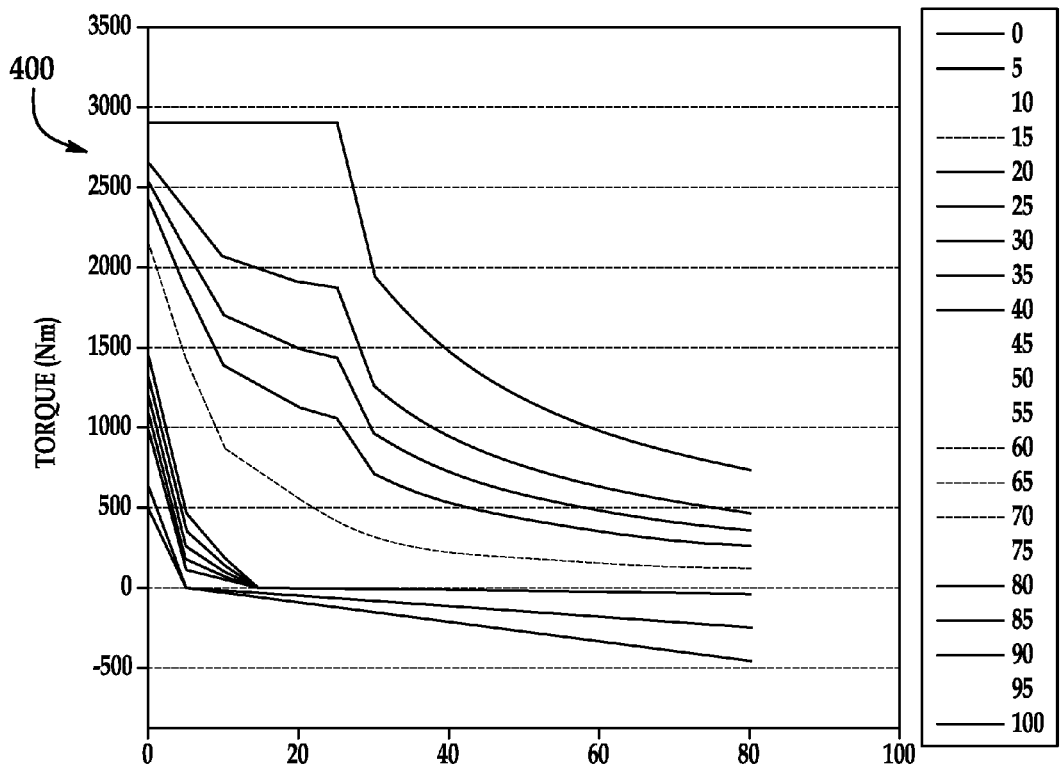
FIG. 4 is a table which illustrates torque (Nm) of a prime mover in a vehicle as a function of vehicle accelerator pedal position (%) at various speeds (mph) of the vehicle according to an alternative illustrative embodiment of the vehicle coasting control method.
FIG. 4A is a graph which illustrates an exemplary accelerator pedal map which incorporates the data of FIG. 4 in implementation of an alternative illustrative embodiment of the vehicle coasting control method.

Referring next to FIGS. 4 and 4A, a table which illustrates torque (Nm) of a prime mover in a vehicle as a function of vehicle accelerator pedal position (%) at various speeds (mph) of the vehicle according to an alternative illustrative embodiment of the vehicle coasting control method is shown in FIG. 4. An exemplary accelerator pedal map 300 which incorporates the data of FIG. 4 in implementation of an alternative illustrative embodiment of the vehicle coasting control method is shown in FIG. 4A. In the graph 400, torque (Nm) which is applied by the prime mover of the vehicle is plotted as a function of the accelerator pedal position as percentage of the accelerator pedal position range. At lower vehicle speeds, the coast zone starts at about the 10% pedal position.

The vehicle coasting control system of the invention may further be utilized in a vehicle with a prime mover and a speed control input device other than an accelerator pedal, such as in autonomous vehicles. For instance, a vehicle coasting control system for such an autonomous vehicle may include a speed control input device and a vehicle controller adapted to operate the prime mover at idle when the speed control input indicates coast. The vehicle controller may interface with the speed control input to control operating speeds of the prime mover of the vehicle corresponding to positions of the speed control input device.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A vehicle coasting control system for a vehicle having a prime mover, comprising:
   an accelerator pedal interfacing with a vehicle controller, the vehicle controller configured to detect a position of accelerator pedal depression greater than zero and transmit the detected position to the vehicle controller;
   the vehicle controller comprising memory storing computer program instructions and at least one processor configured to execute the computer program instructions, the at least one processor configured to operate the prime mover at idle in response to a determination by the controller that the accelerator pedal is positioned at a coast zone within an accelerator pedal position range, said idle comprising applying zero torque to wheels of the vehicle, said coast zone comprising only pedal positions of the accelerator pedal between a minimum pedal position and a maximum pedal position within the accelerator pedal position range, said coast zone and said accelerator pedal position range predetermined by the controller; and,
   the at least one processor further configured to operate the prime mover to apply torque to wheels of the vehicle in response to a determination by the controller that the accelerator pedal is not positioned at the coast zone but is positioned between the minimum pedal position and the maximum pedal position.

2. The vehicle coasting control system of claim 1 wherein said minimum pedal position of the accelerator pedal corresponds to an idle operating speed of the prime mover of the vehicle and a maximum pedal position of the accelerator pedal corresponds to a maximum operating speed of the prime mover of the vehicle.

3. The vehicle coasting control system of claim 2 wherein the coast zone comprises at least one pedal position of the accelerator pedal between the minimum pedal position and the maximum pedal position within the accelerator pedal position range.

4. The vehicle coasting control system of claim 2 wherein the coast zone comprises at least one range of pedal positions of the accelerator pedal between the minimum pedal position and the maximum pedal position within the accelerator pedal position range.

5. The vehicle coasting control system of claim 1 wherein the coast zone begins at about a 10% pedal position of the accelerator pedal within the accelerator pedal position range.

6. The vehicle coasting control system of claim 1 wherein the coast zone begins at about a 20% pedal position of the accelerator pedal within the accelerator pedal position range.

7. The vehicle coasting control system of claim 6 wherein the coast zone begins at about a 20% pedal position of the accelerator pedal and ends at about a 50% pedal position of the accelerator pedal within the accelerator pedal position range.

8. A vehicle coasting control system for a vehicle, comprising:
   a vehicle prime mover configured to convey the vehicle at speeds within a speed range of the vehicle;
   an accelerator pedal positional throughout an accelerator pedal position range, the accelerator pedal interfacing with a vehicle controller, said vehicle controller configured to detect a position of accelerator pedal depression greater than zero within the accelerator pedal position range and transmit the detected position to the vehicle controller;
   the vehicle controller further interfacing with the vehicle prime mover, the vehicle controller comprising memory storing computer program instructions and at least one processor configured to execute the computer program instructions, the at least one processor configured to control operating speeds of the prime mover of the vehicle in response to respectively detected accelerator pedal positions;
   the vehicle controller further configured to operate the prime mover at idle when the accelerator pedal is positioned at a coast zone within the accelerator pedal position range, said idle comprising applying zero torque to wheels of the vehicle, said coast zone comprising only pedal positions of the accelerator pedal between a minimum pedal position and a maximum pedal position within the accelerator pedal position range, said coast zone and said accelerator pedal position range predetermined by the controller; and,
   the at least one processor further configured to operate the prime mover to apply torque to wheels of the vehicle in response to a determination by the controller that the accelerator pedal is not positioned at the coast zone but is positioned between the minimum pedal position and the maximum pedal position.

9. The vehicle coasting control system of claim 8 wherein the minimum pedal position of the accelerator pedal corresponds to an idle operating speed of the prime mover of the vehicle and a maximum pedal position of the accelerator pedal corresponds to a maximum operating speed of the prime mover of the vehicle.

10. The vehicle coasting control system of claim 9 wherein the coast zone comprises at least one pedal position of the accelerator pedal between the minimum pedal position and the maximum pedal position within the accelerator pedal position range.

11. The vehicle coasting control system of claim 9 wherein the coast zone comprises at least one range of pedal positions of the accelerator pedal between the minimum pedal position and the maximum pedal position within the accelerator pedal position range.

12. The vehicle coasting control system of claim 8 wherein the coast zone begins at about a 10% pedal position of the accelerator pedal within the accelerator pedal position range.

13. The vehicle coasting control system of claim 8 wherein the coast zone begins at about a 20% pedal position of the accelerator pedal within the accelerator pedal position range.

14. The vehicle coasting control system of claim 13 wherein the coast zone begins at about a 20% pedal position of the accelerator pedal and ends at about a 50% pedal position of the accelerator pedal within the accelerator pedal position range.

15. A computer-implemented vehicle coasting control method having a prime mover and a speed control input value, the method comprising:
  operating in response to a vehicle controller the prime mover at idle when the speed control input value is determined by the controller to be at a coast zone value, said speed control input value determined in response to a speed control state greater than zero, said idle comprising applying zero torque to wheels of the vehicle, said coast zone value comprising only speed control input values between a minimum vehicle speed control input value and a maximum vehicle speed control input value, said coast zone values and said minimum and maximum speed control input values predetermined by the controller; and
  operating in response to a vehicle controller the prime mover by applying torque to wheels of the vehicle in response to a determination by the controller that the speed control input value is not positioned at the coast zone value but is positioned between the minimum vehicle speed control input value and the maximum vehicle speed control input value.

16. The vehicle coasting control method of claim 15 wherein determining when the speed control input value is at a coast zone value comprises determining whether an accelerator pedal of a vehicle is depressed to be at a coast zone within an accelerator pedal position range of the accelerator pedal, said coast zone comprising at least one pedal position of the accelerator pedal within the accelerator pedal position range.

17. The vehicle coasting control method of claim 16 wherein determining whether an accelerator pedal of a vehicle is at a coast zone within an accelerator pedal position range of the accelerator pedal comprises determining whether the accelerator pedal of the vehicle is at a coast zone within the accelerator pedal position range ranging the from a minimum pedal position to a maximum pedal position of the accelerator pedal.

18. The vehicle coasting control method of claim 16 wherein determining whether an accelerator pedal of a vehicle is at a coast zone within an accelerator pedal position range of the accelerator pedal comprises determining whether the accelerator pedal of the vehicle is in at least one pedal position of the accelerator pedal within the accelerator pedal position range.

19. The vehicle coasting control method of claim 16 wherein determining whether an accelerator pedal of a vehicle is at a coast zone within an accelerator pedal position range of the accelerator pedal comprises determining whether the accelerator pedal of the vehicle is in at least one range of pedal positions of the accelerator pedal within the accelerator pedal position range.

20. The vehicle coasting control method of claim 16 further comprising accelerating the prime mover to an operating level corresponding to an accelerator pedal position of the accelerator pedal if the accelerator pedal is not at the coast zone.

21. The vehicle coasting control method of claim 16 further comprising determining a speed of the vehicle, and wherein operating a prime mover of the vehicle at idle if the accelerator pedal is at the coast zone comprises operating a prime mover of the vehicle at idle if the accelerator pedal is at the coast zone and the speed of the vehicle exceeds a predetermined speed value for the vehicle.

22. A vehicle coasting control system for a vehicle comprising:
  a prime mover of the vehicle;
  a speed control input device interfacing with a vehicle controller, the vehicle controller interfacing with the prime mover, said vehicle controller configured to detect a speed control input device position greater than zero including a coast speed control input position and transmit the detected position to the vehicle controller;
  wherein the vehicle controller comprises memory storing computer program instructions and at least one processor configured to execute the computer program instructions, the at least one processor is configured to operate the prime mover at idle when the speed control input device indicates a coast speed control input position value, said idle comprising applying zero torque to wheels of the vehicle, said coast speed control input position value comprising only speed control input position values between a minimum vehicle speed control input value and a maximum vehicle speed control input value, said coast speed control input position value and said minimum and maximum vehicle speed control input values predetermined by the controller; and,
  the at least one processor further configured to operate the prime mover to apply torque to wheels of the vehicle in response to a determination by the controller that the speed control input device indicates a vehicle speed control input position value other than the coast speed control input position values between the minimum and maximum vehicle speed control input values.

23. The vehicle coasting control system of claim 22, wherein said vehicle controller controls operating speeds of the prime mover of the vehicle corresponding to the positions of the speed control input device.

24. The vehicle coasting control system of claim 22, wherein said coast speed control input position value is within a predetermined input range of speed control input position values.

25. The vehicle coasting control system of claim 24, wherein said predetermined input range comprises a minimum input value of the speed control input device corresponding to an idle operating speed of the prime mover of the vehicle and a maximum input value of the speed control input device corresponding to a maximum operating speed of the prime mover of the vehicle.

\* \* \* \* \*